US008823485B2

(12) United States Patent
Schmidt et al.

(10) Patent No.: US 8,823,485 B2
(45) Date of Patent: Sep. 2, 2014

(54) PROGRAMMABLE REMOTE CONTROL UNIT AND METHOD

(75) Inventors: Andreas Schmidt, Braunschweig (DE); Norbert Schwagmann, Braunschweig (DE); Achim Luft, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 918 days.

(21) Appl. No.: 12/017,946

(22) Filed: Jan. 22, 2008

(65) Prior Publication Data

US 2008/0174449 A1 Jul. 24, 2008

Related U.S. Application Data

(60) Provisional application No. 60/885,981, filed on Jan. 22, 2007.

(30) Foreign Application Priority Data

Jan. 22, 2007 (DE) ......................... 10 2007 003 161

(51) Int. Cl.
*G05B 19/04* (2006.01)
*G08C 17/00* (2006.01)

(52) U.S. Cl.
CPC ............ *G08C 17/00* (2013.01); *G08C 2201/21* (2013.01); *G08C 2201/92* (2013.01)
USPC ....................... 340/4.3; 340/12.23; 340/12.28

(58) Field of Classification Search
CPC ............... G08C 17/00; G08C 2201/20; G08C 2201/21; G08C 2201/33; G08C 2201/50; G08C 2201/92; G06F 3/0481; G06F 9/445
USPC ........ 340/825.69, 825.72, 825.22, 4.3, 12.22, 340/12.23, 12.24, 12.25, 12.26, 12.28, 340/12.5; 715/744; 709/203
See application file for complete search history.

(56) References Cited

U.S. PATENT DOCUMENTS 6,791,467 B1 * 9/2004 Ben-Ze'ev ................. 340/12.25
6,828,992 B1 12/2004 Freeman et al.

(Continued)

FOREIGN PATENT DOCUMENTS

CN 1401156 A 3/2003
JP 10-271577 A 10/1998

(Continued)

OTHER PUBLICATIONS

Sony Ericsson Developers Guidelines: "Bluetooth TM HID remote control", Nov. 2007.

(Continued)

*Primary Examiner* — Nabil Syed
(74) *Attorney, Agent, or Firm* — Schwabe, Williamson & Wyatt, P.C.

(57) ABSTRACT

A programmable remote control unit and method. The remote control unit includes a remote control configuration file request message generating circuit configured to generate a remote control configuration file request message, the remote control configuration file request message comprising operating characteristics of the remote control unit having information about a usage characteristic of a user of the remote control unit. A transmitter is configured to send the remote control configuration file request message to a remote control configuration file generating circuit. A receiver is configured to receive the at least one remote control configuration file. A memory is configured to store the at least one remote control configuration file. A remote control configuration circuit is configured to configure the remote control unit in accordance with the at least one remote control configuration file.

21 Claims, 6 Drawing Sheets

(56) References Cited

U.S. PATENT DOCUMENTS

| | | | | |
|---|---|---|---|---|
| 2003/0226768 | A1 | 12/2003 | Hoffman et al. | |
| 2004/0131076 | A1* | 7/2004 | Smith | 370/432 |
| 2005/0256590 | A1 | 11/2005 | Choi | |
| 2006/0288300 | A1* | 12/2006 | Chambers et al. | 715/744 |

FOREIGN PATENT DOCUMENTS

| | | | |
|---|---|---|---|
| JP | 2002-291072 | A | 10/2002 |
| JP | 2004-015787 | A | 1/2004 |
| WO | WO-02/31978 | A2 | 4/2002 |
| WO | WO-03/044684 | A1 | 5/2003 |
| WO | WO-2004/086639 | A1 | 10/2004 |

OTHER PUBLICATIONS

Sony Ericcson Developer Guidelines: “Bluetooth TM HID remote control”, Oct. 2004.

Extensible Markup Language (XML) 1.1, Feb. 4, 2004.

Specification of the Bluetooth System, Version 2, Nov. 4, 2004.

* cited by examiner

PROGRAMMABLE REMOTE CONTROL UNIT AND METHOD

TECHNICAL FIELD

The embodiments relate to a remote control unit, a remote control configuration file generator unit, a remote-controllable device, a remote control configuration file generator, a method for determining a configuration of a remote control unit, a method for generating a remote control configuration file and a method for remote-controlling a remote-controllable device.

BACKGROUND OF THE INVENTION

A flexible programmable remote control unit is desirable which can be used for different remote-controllable devices.

BRIEF DESCRIPTION OF THE FIGURES

Illustrative embodiments are shown in the figures and will be explained in greater detail in the text which follows. In the figures, identical reference symbols are used for identical or similar elements as far as appropriate.

DETAILED DESCRIPTION

Figure 1:
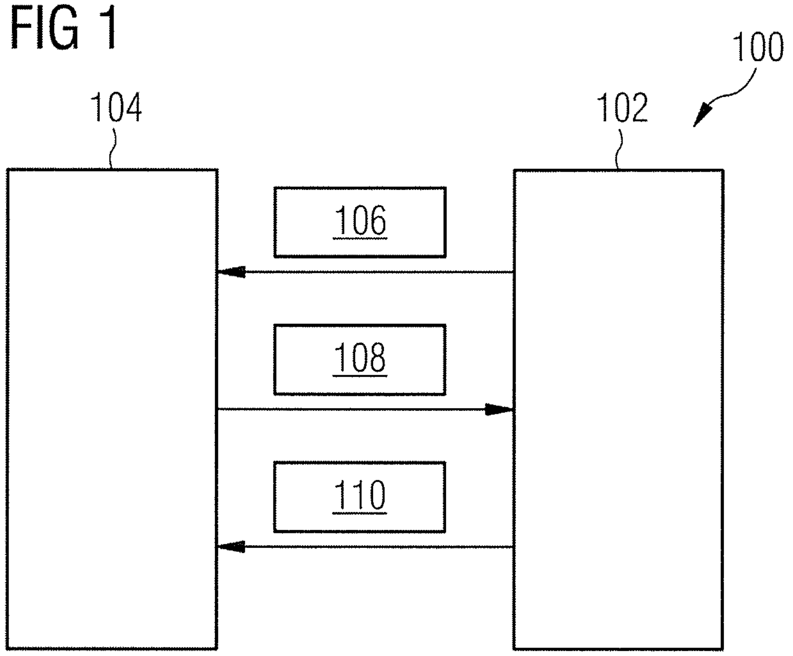
FIG. 1 shows a communication system with a remote control unit and a remote-controllable device according to an illustrative embodiment.

In the present description, the terms "linked", "connected", and "coupled" are used for describing a direct and an indirect connection and a direct or indirect coupling. In the figures, identical or similar elements are provided with identical reference symbols as far as appropriate.

There are adaptive remote control units which at the same time send IR (Infrared) signals and RF (radio) signals. The RF (radio) signal usually contains the same information as the IR signal, but has the advantage that it can also be sent through walls. The RF signals are received by an intermediary device, usually provided additionally, which, in this method, is setup within visual range of the device actually to be controlled. The intermediary device converts the information obtained by radio into IR signals and thus controls the device actually to be controlled within visual range. In consequence, the user can control by means of a remote control unit equipped in this manner devices with which he does not have direct visual contact because they are located, for example, in a neighbouring room.

As a rule, an adaptive remote control must be adapted to the device(s) to be controlled. In detail, this means that the control commands to be emitted by the remote control unit are selected to suit the device to be controlled.

The individual control commands can thereby already be stored in the remote control unit. In this case, the user informs the remote control unit, mostly by manually inputting numeric codes which describe the device manufacturer, the device class and/or the device type, which set of control commands is to be currently used for the device to be controlled.

Furthermore, it is possible that an original remote control unit is used for transmitting the individual control commands step by step to an adaptive remote control unit. The IR signals are then read in by an IR sensor in the adaptive remote control unit, allocated to a key and correspondingly stored for subsequent utilization.

In some cases, a software program, with the aid of which the programming can be carried out in a more user-friendly manner, is also supplied together with an adaptive remote control unit. The manual input of the numeric code or the manual transmission of control commands can be simplified somewhat in this manner in that the adaptive remote control unit is connected, for example, to a personal computer (PC) via the serial interface and the new control commands can be read out either from an internal database of the computer or from an external database in the Internet. This method is particularly well suited for subsequent updating of the control commands.

Some remote control units enable the user to allocate functions to keys in accordance with his own concepts, independently of the state of the remote control unit and independently of the state of the device to be controlled, respectively, wherein a concatenation of a number of commands is also permitted in some cases (programming of so-called macro-functions).

In adaptive remote control units, soft keys can be used. These are keys which are occupied with different functions in dependence on the current application. The designation "soft" is due to the fact that the function of the keys is not permanently predetermined but can be dynamically adapted. As a rule, the allocation of functions of soft keys in adaptive remote control units changes with the state of the remote control unit (depending on progress when clicking through the selection of a menu structure). In most cases, a display or at least an adjacent display section is allocated to a soft key so that it is possible to show the user the function with which the respective soft key is currently occupied. The function allocations are in most cases indicated with the aid of predefined display objects (such as pictograms, text modules (also abbreviations), combinations of the two and the like).

When functions are allocated to keys and soft keys, the user can also be provided with the capability of designing new pictograms by himself, or selecting a particular pictogram from a multiplicity of predefined display objects, respectively, and assigning it selectively to a particular key or a particular macrofunction by means of special computer software.

For mobile radio terminals by SonyEricsson, the use of so-called HID configuration files is possible. HID is the name of a Bluetooth application profile and stands for Human Interface Device (i.e. man/device interface). The HID configuration files which can have an XML file and/or an image file can be used for informing certain SonyEricsson mobile radio terminals which HID control commands are to be sent out when pressing a particular key, in deviation from the actual keypad allocation. In this manner, key allocations can be changed in a proprietary manner (i.e. by a proprietary method) for a certain time in some SonyEricsson mobile radio terminals. The image file can be used for displaying the changed key allocation to the user on the monitor of selected mobile radio terminals. HID configuration files can be downloaded into a mobile radio terminal by the conventional ways (such as, for example, e-mail or MMS (Multimedia Messaging Service)), or can be preinstalled there.

The Bluetooth SIG body responsible for the standardization of the Bluetooth technology (an example of a radio transmission technology in an ad-hoc communication network) also defines, apart from the physical transmission methods and protocol layers, application profiles ("Bluetooth Profiles") which are intended to guarantee the interoperation of Bluetooth devices from different manufacturers. In such an application profile, rules, protocols and data formats can be defined for a dedicated application scenario. In many cases, an application profile can be understood to be a vertical section through the entire protocol layer model in that it specifies for each protocol layer the obligatory protocol components or defines application-profile-specific parameters for a particular protocol layer. This ensures a high degree of interoperability. By using application profiles, the user also has the advantage that he does not need to match two or more terminals manually to one another. The most important application profile is the Generic Access Profile (GAP) with fundamental functions for connection set-up and for authentication, on which all other application profiles are based.

The conventional systems require a high degree of interaction between the adaptive remote control unit and the user before the adaptive remote control unit is optimally adapted to the device to be operated. This often exceeds the capabilities of a user of a remote control unit who has an average technical talent.

There is additionally a further problem in manually inputting numeric codes: it is frequently necessary that the user inputs a multiplicity of numeric codes manually one after the other and tests these individually since different devices expect different numeric codes even within one device class or within one group of devices of the same manufacturer.

The method using the HID configuration files only works if the mobile radio terminal can be informed by the other HID end which HID control commands are expected by the other HID end when a certain key is pressed. It is thus necessary that both mobile radio terminal and other HID end agree on the use of the same HID configuration file which, however, cannot be negotiated between the conventional devices involved. The risk of malfunctions caused by the fact that two devices "talk past one another" because only one of the devices involved (either transmitter end or receiver end) has knowledge of the deviating allocation of the control commands sent out is given in this case.

FIG. 1 shows a communication system 100 with a remote control unit 102 and a remote-controllable device 104 according to one illustrative embodiment.

According to an illustrative embodiment, a remote control unit 102 is understood to be, for example, a device or an arrangement by means of which control signals or control messages are generated for controlling, in other words remote-controlling, a device not accommodated in the same housing, for example the remote-controllable device 104. In principle, the remote control unit 102 can be connected to the remote-controllable device 104 by means of any type of communication link (optical, wire-connected, wireless, radio-based, sound-based etc.). For the embodiments explained in greater detail in the text which follows, it is assumed that the remote control unit 102 and the remote-controllable device 104 are connected to one another in accordance with a Bluetooth radio communication link and exchange data with one another in accordance with this communication standard.

According to an illustrative embodiment, a remote-controllable device 104 is understood to be, for example, a device which can be remote-controlled by means of a remote-control unit 102, wherein, for example, predeterminable functions of the remote-controllable device 104 can be selected and executed or, for example, the operating state of the remote-controllable device 104 can be changed.

As will still be explained in greater detail in the text which follows, the remote control unit 102, according to an illustrative embodiment, generates a remote control configuration file request message 106 and sends it to a remote control configuration file generating unit which, in one illustrative embodiment, is implemented in the remote-controllable device 104. The remote control configuration file request message 106 which, according to an illustrative embodiment, contains operating characteristics of the remote control unit 102, is used for requesting one or more remote control configuration files.

The components of the remote control unit 102 and of the remote-controllable device 104, described above and in the text which follows, can be implemented in hardware, in other words by means of one or more correspondingly arranged electronic circuits, or in software, in other words by means of one or more correspondingly arranged computer programs, or in an arbitrary hybrid form, in other words in arbitrary parts in hardware or in software.

Following the reception of the remote control configuration file request message 106, the remote-controllable device 104 generates one or more remote control configuration files by means of a remote control configuration file generating unit provided therein, which will still be explained in greater detail in the text which follows. The one or more remote control configuration files are sent to the remote control unit 102 in a remote control configuration file response message 108.

It must be pointed out that in an alternative embodiment, the remote control configuration file generating unit is not provided in the remote-controllable device 104. In this case, the remote control configuration file request message 106 is not sent to the remote-controllable device 104 but directly to the remote control configuration file generating unit implemented in another device, or forwarded directly from the remote-controllable device 104 to this other device in which the remote control configuration file generating unit is implemented. Possibly, the remote control configuration file request message 106, before being forwarded to the other device, is still modified by the remote-controllable device 104, for example supplemented by an identifier of the remote-controllable device 104. The remote control configuration file request message 106 can be transmitted cablelessly on a first interface (e.g. between the remote control unit 102 and the remote-controllable device 104) and cable-connected on a second interface (e.g. between the remote-controllable device 104 and the other device in which the remote control configuration file generating unit is implemented). In this illustrative embodiment, the remote control configuration file generating unit determines (for example by using a database in which in each case one or more configuration file is or are stored for a remote-controllable device or for a multiplicity of different remote-controllable devices) the remote control configuration file provided for a remote-controllable device which, in the present illustrative embodiment, specified, in other words, identified, in the remote control configuration file request message 106 by using the operating characteristics of the remote control unit 102, contained in the remote control configuration file request message 106, which will be explained in greater detail in the text which follows. In this case, the remote control configuration file generated is transmitted to the remote control unit 102, for example, also in one or in a number of remote control configuration file response messages 108. If it is a remote control configuration file request message 106 modified by the remote-controllable device 104 in accordance with the above descriptions, the remote control configuration file generating unit determines one or more remote control configuration file(s) which is or are, respectively, matched to the pair of devices consisting of remote control unit 102 and remote-controllable device 104.

Following the reception of the remote control configuration file response message 108, the remote control unit 102 determines the one or more remote control configuration files from the remote control configuration file response message 108 and stores the one remote control configuration file determined or the plurality of remote control configuration files determined in a memory.

Furthermore, the remote control unit automatically or semiautomatically (in other words by including the user of the remote control unit 102) configures itself at least partially in accordance with the one or more remote control configuration files received, as will be explained in greater detail in the text which follows.

For remote-controlling the remote-controllable device 104, the remote control unit 102 generates corresponding control signals and/or control messages with corresponding control commands and sends these to the remote-controllable device 104 in a remote control message 110 or in a number of remote control messages 110.

Following the reception of the one remote control message 110 or of the number of remote control messages 110, the remote-controllable device 104 determines the control signals or the control commands, respectively, and executes them as instructed.

Figure 2:
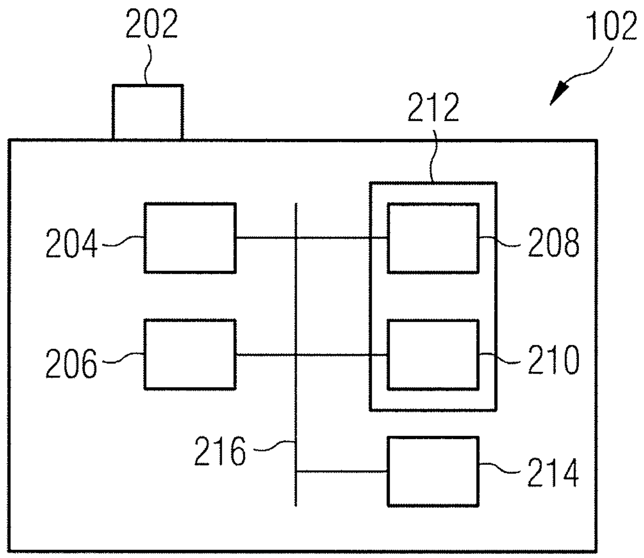
FIG. 2 shows a representation of components of a remote control unit according to an illustrative embodiment.

FIG. 2 shows components of the remote control unit 102 according to an illustrative embodiment.

According to one illustrative embodiment, the remote control unit 102 has an antenna 202, a transmitter 204, a receiver 206, a remote control configuration file request message generating unit 208 and a remote control configuration unit 210 and a memory 214. The individual components 202, 204, 206, 208, 210 and 214 are coupled to one another by means of a unidirectional or bidirectional communication link, for example by means of a computer bus 216.

The remote control configuration file request message generating unit 208 and the remote control configuration unit 210 can be formed as independent separate components. In an alternative embodiment, the remote control configuration file request message generating unit 208 and the remote control configuration unit 210 are implemented by means of a jointly used programmable processor, for example by means of a microprocessor 212 in the form of correspondingly arranged computer program procedures (as an alternative, computer program objects).

The transmitter 204 and/or the receiver 206 are/is set up for transmitting and receiving, respectively, signals according to the same or according to different transmission technologies.

For example, the transmitter 204 and/or the receiver 206 can be set up for transmitting/receiving signals according to one or more of the following transmission technologies:

- optical transmission technology or technologies, for example by means of infrared signals (for example according to IrDA (Infrared Data Association));
- sound-based transmission technology or technologies;
- radio-based transmission technology or technologies, for example according to a mobile radio transmission technology, for example according to a cell-based mobile radio transmission technology, for example according to a mobile radio communication standard such as, for example, GSM (Global System for Mobile Communications), 3GPP (Third Generation Partnership Project), for example UMTS (Universal Mobile Telecommunications System), FOMA (Freedom Of Mobile Multimedia Access), CDMA 2000 (Code Division Multiple Access 2000), EDGE (Enhanced Data Rates for GSM Evolution), GPRS (General Packet Radio Service), for example according to a near-field radio standard such as, for example, Bluetooth Wireless technology and/or Ultra Wide Band, and the like.

In one illustrative embodiment, the transmitter 204 is set up for sending the remote control configuration file request message 106 to the remote control configuration file generating unit, for example the remote-controllable device 104.

In one illustrative embodiment, the receiver 206 is set up for receiving at least one remote control configuration file which will still be explained in greater detail in the text which follows.

In one illustrative embodiment, the remote control configuration file request message generating unit 208 is set up in such a manner that it generates a remote control configuration file request message (for example 106), the remote control configuration file request message 106 containing operating characteristics of the remote control unit 102.

In one illustrative embodiment, operating characteristics of the remote control unit 102 are understood to be, for example, information about hardware features of the remote control unit 102, software features of the remote control unit 102, preferences of the user of the remote control unit 102 and a history about the utilization of the remote control unit 102, although other features characterizing the operation of the remote control unit 102 can also be provided in other illustrative embodiments.

In one illustrative embodiment, the operating characteristics of the remote control unit 102 contain characteristics of at least one input unit of the remote control unit 102 and/or characteristics of at least one output unit of the remote control unit 102.

Within the present description, an input unit can include a number of input elements. The input elements forming an input unit can be of the same type (e.g. a number of keys of a keypad), or can consist of different types (key and microphone). In principle, the same also applies to the output unit (e.g. a number of pixels of a display unit or the combination of lamp and loudspeaker).

In one illustrative embodiment, the characteristics of at least one input unit of the remote control unit 102 contain information about the function programmability of the at least one input unit (for example information about whether an input element (for example a key) of the input unit (for example a keypad having a number of keys) is variable, i.e. programmable, in its functionality or not, possibly with the indication of the functionality currently allocated to the respective input element) and/or information about the placement programmability of the at least one input unit (for example information about the position at which an input element can be positioned within the input unit or, respectively, at which position the input element is currently arranged (for example in the case where the input element is a software-based key on a touch-sensitive screen).

In one illustrative embodiment, the information about the hardware features of the remote control contains at least one of the following information items:

- device identifiers (for example an unambiguous identification of the device);
- number and position of non-programmable keys (for example number and position of permanently labelled keys);
- number and position of programmable keys;
- number and position of software-based keys;
- number, characteristics and position of at least one display unit;
- available storage space (in other words available memory size) in the memory (for example for macrofunctions, etc.);
- number, characteristics and positions of display units (for example displays) or, respectively, of touch-sensitive display units (for example touch-sensitive displays).

In one illustrative embodiment, the information about the software features of the remote control unit 102 contains at least one of the following information items:

- software identification characteristics (for example an unambiguous identification of the computer program);
- information about the codes supported by the remote control unit 102 for displaying picture elements (for example pictograms) or text elements (for example text modules);
- information about macrofunctions supported by the remote control unit;
- maximum permitted depths of concatenation of macrofunctions.

In one illustrative embodiment, the information about preferences of the user of the remote control unit contains at least one of the following information items:

- the user prefers the use of an input element of the at least one input unit (in one illustrative embodiment: the user considers the use of the click wheel of Apple's ipod for navigating to be particularly simple);
- the user prefers the use of an output element of the at least one output unit (in one illustrative embodiment: the user best of all likes to use the menu prompting (or the human/machine interface (HMI)) of mobile radio telephones by the manufacturer LG Electronics;
- the user is used to the "colour themes" (colour patterns) of the manufacturer Panasonic.

In an illustrative embodiment, human/machine interface (HMI) designates the subsystem in a human/machine system by means of which humans interact with a machine via a user interface. To be operable by humans, it is adapted especially to the needs of humans. The HMI enables the operator to operate a machine, to observe equipment states and, if necessary, to intervene in the process. The information is provided, for example, by hardware via control consoles with signal lamps, loudspeakers, display panels and key buttons or by software via a visualization system which, for example, runs on a terminal.

In one illustrative embodiment, the information about the history of the utilization of the remote control unit contains at least one of the following information items:

- information about at least one temporally preceding configuration of the remote control unit (in one illustrative embodiment: the last five keypad allocations (configurations) were negotiated with HiFi devices by the manufacturer Yahama (type ID="HiFi device", manufacturer ID="Yahama"));
- information about the frequency of use of an input element of the at least one input unit;
- information about the frequency of use of an output element of the at least one output unit (in one illustrative embodiment: the muting function (allocated to the mute key) has not been used for eight months).

In one illustrative embodiment, the characteristics of at least one output unit of the remote control unit contain at least one of the following information items:

- information about the function programmability of the at least one output unit;
- information about the placement programmability of the at least one output unit.

The categorization described above describes an illustrative selection of parameters which can be utilized for negotiating the configuration details (e.g. keypad allocation) of the remote control unit 102.

In this manner, the adaptation of a universal remote control unit 102 which can also be present in the form of a mobile radio terminal, with regard to optimum function allocation of keys and with regard to optimum utilization of the display (if present) can be carried out completely automatically (i.e. negotiated between the devices involved) and thus interaction between user and remote control is reduced to a minimum. This takes into consideration not only the hardware characteristics software characteristics of the device used as remote control unit 102 (example: keypad layout) but also optionally numerous "soft" criteria such as experience, familiarity and preferences of the user with regard to other devices, device classes, manufacturers etc.

Effects of illustrative embodiments are, among others:

- the adaptation of the remote control unit 102 to the device 104 to be controlled is completely (as an alternative, partially) automatic.
- The procedure for negotiating the function allocation offers full flexibility.
- The interaction between remote control unit and user during the programming can be reduced to a minimum.
- The user is offered a remote control unit optimally adapted to his individual needs and preferences.
- Furthermore, the expectations of the Bluetooth SIG of their members with regard to the development of new Bluetooth application profiles are fulfilled.

In the memory 214, the remote control configuration file(s), which are explained in greater detail in the text which follows and which was (were) transmitted, for example, by the remote control configuration file generating unit, is/are stored.

The remote control configuration unit 210 is set up for configuring the remote control unit 102 according to the at least one remote control configuration file (for example, the remote control configuration unit 210 is set up for programming keys (with regard to their function and/or their placement or arrangement on) the remote control unit 102)).

Figure 3:
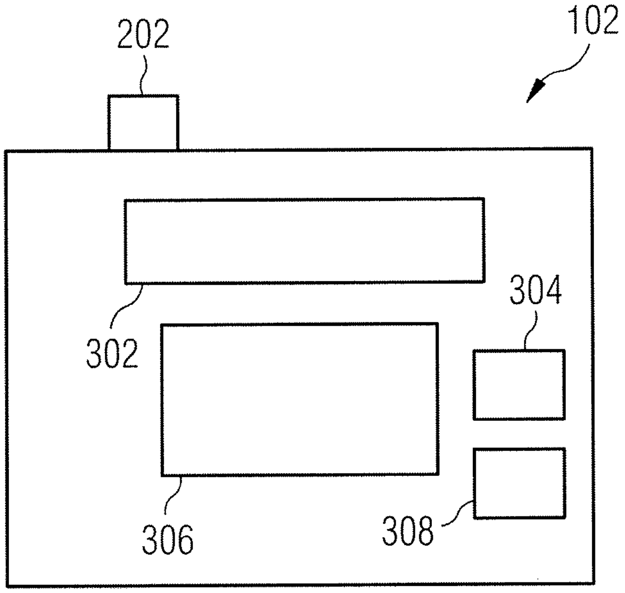
FIG. 3 shows a top view of a remote control unit according to an illustrative embodiment.

FIG. 3 shows a top view of a remote control unit 102 according to one illustrative embodiment.

The remote control unit 102 has, in addition to the usual operating elements which, for reasons of clarity, will not be described in greater detail within this description, one or more display units 302 (for example a display, for example a touch-sensitive display (touch screen)) and one or more loudspeakers 304 as output units.

Furthermore, the remote control unit 102 has a keypad 306 with a plurality of numeric keys (for example the numeric keys "0", "1", . . . , "9") and/or one or more control keys (to which, for example, a (permanently or variably) preset function is allocated), and one or more microphones 308 as input units.

Figure 4:
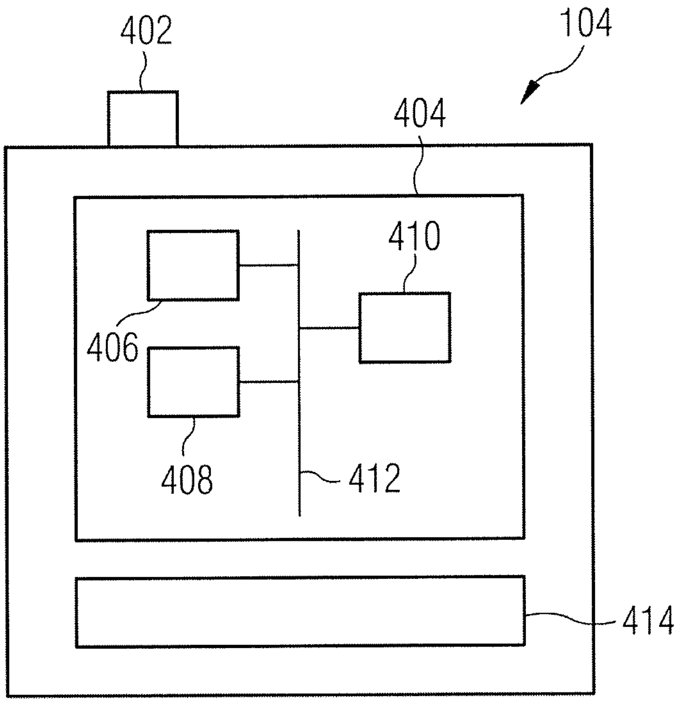
FIG. 4 shows a representation of components of a remote-controllable device according to an illustrative embodiment.

FIG. 4 shows components of a remote-controllable device 104 according to one illustrative embodiment.

According to one illustrative embodiment, the remote-controllable device 104 has an antenna 402 and a remote control configuration file generating unit 404. In one illustrative embodiment, the remote control configuration file generating unit 404 has:

- a receiver 408 for receiving at least one remote control configuration file request message, the remote control configuration file request message includes operating characteristics of a remote control unit;
- a remote control configuration file generator 410 for generating a remote control configuration file, taking into consideration the received operating characteristics of the remote control unit;
- a transmitter 406 for transmitting the remote control configuration file to a remote control unit.

The receiver 408, the transmitter 406 and the remote control configuration file generator 410 are coupled to one another by means of a unidirectional or bidirectional communication link, for example by means of a computer bus 412.

The transmitter 406 and/or the receiver 408 is/are set up for transmitting and receiving, respectively, signals according to the same or according to different transmission technologies. For example, the transmitter 406 and/or the receiver 408 can be set up for transmitting/receiving signals according to one or more of the following transmission technologies:

- optical transmission technology or technologies, for example by means of infrared signals (for example according to IrDA (Infrared Data Association));
- sound-based transmission technology or technologies;
- radio-based transmission technology or technologies, for example according to mobile radio transmission technology, for example according to a cell-based mobile radio transmission technology, for example according to a mobile radio communications standard such as, for example, GSM (Global System for Mobile Communications), 3GPP (Third Generation Partnership Project), UMTS (Universal Mobile Telecommunications System), FOMA (Freedom of Mobile Multimedia Access), CDMA 2000 (Code Division Multiple Access 2000), EDGE (Enhanced Data Rates for GSM Evolution), GPRS (General Packet Radio Service), for example according to a near-field radio standard such as Bluetooth Wireless Technology and/or Ultra Wide Band Technology and the like.

In one illustrative embodiment, the remote control configuration file contains instructions and/or structure information for configuring the remote control unit 102. The remote control configuration file can be provided in a predetermined proprietary format; but in an alternative embodiment, it can also be present in a standardized format.

In an illustrative embodiment, the remote control configuration file is coded in one of the following formats:

- Extensible Markup Language (XML);
- Hypertext Markup Language (HTML);
- Java computer program code.

Furthermore, the remote-controllable device 104 has a control unit 414 for executing control commands which can be input locally by a user of the remote-controllable device 104 (for example by means of input unit(s), described in the text which follows, of the remote-controllable device 104), or which are transmitted by the remote control unit 102 to the remote-controllable device 104. The control unit 414 controls actuators and/or sensors which are also provided in the remote-controllable device 104 for executing the desired functions (possibly input by means of the remote control unit 102). In industrial process measurement and control, they designate the counterpiece to sensors.

Figure 5:
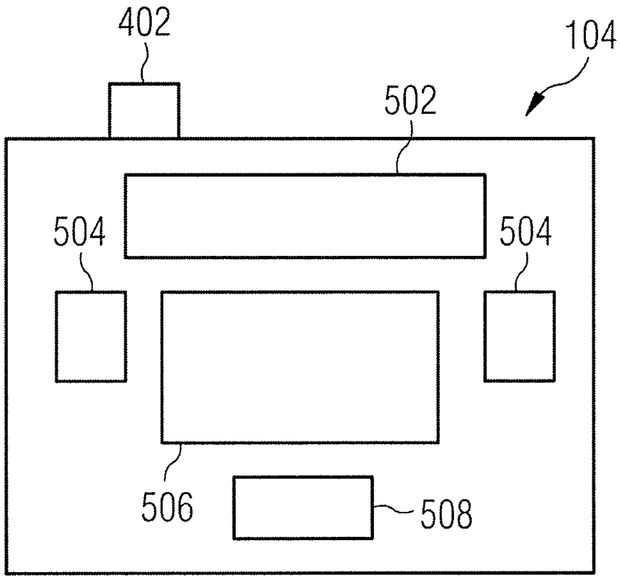
FIG. 5 shows a top view of a remote-controllable device according to an illustrative embodiment.

FIG. 5 shows a top view of the remote-controllable device 104 according to one illustrative embodiment.

The remote-controllable unit 104 has, in addition to the usual operating elements which, for reasons of clarity, will not be described in greater detail within this description, one or more display units 502 (for example a display, for example a touch-sensitive display (touch screen)) and one or more loudspeakers 504 as output units.

Furthermore, the remote-controllable unit 104 has a keypad 506 with a number of numeric keys (for example the numeric keys "0", "1", . . . , "9") and/or one or more control keys (to which, for example, a (permanently or variably) predetermined function is allocated), and one or more microphones 508 as input units.

Figure 6:
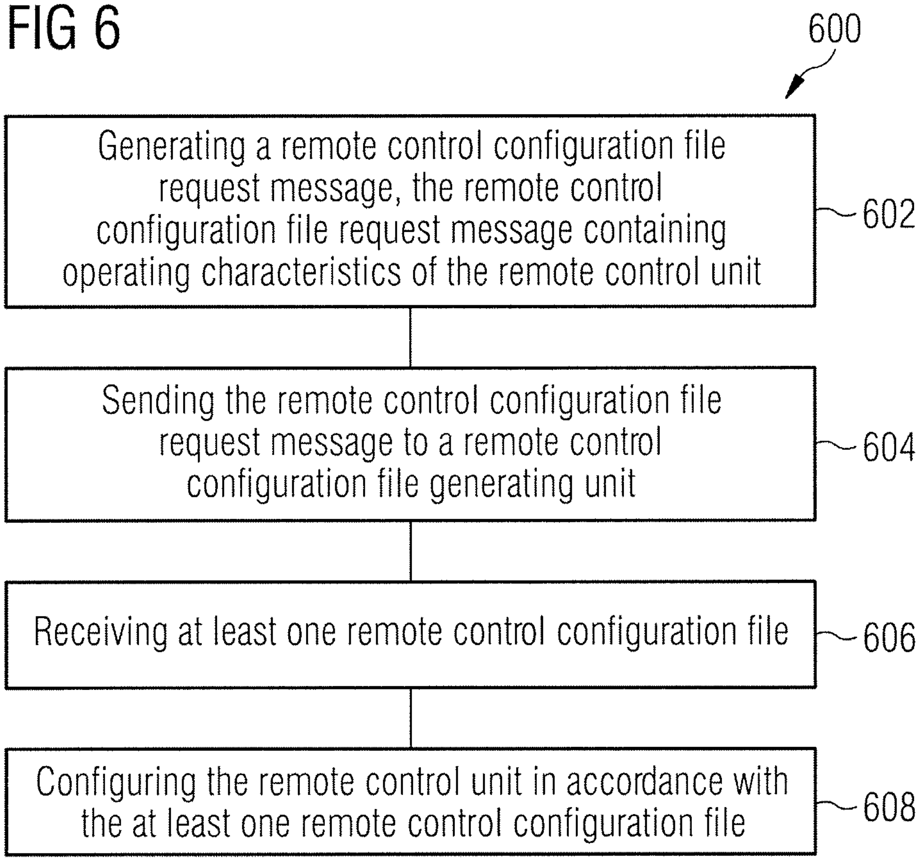
FIG. 6 shows a flow chart in which a method for determining a configuration of a remote control unit according to an illustrative embodiment is shown.

FIG. 6 shows a flow chart 600 in which a method for determining a configuration of a remote control unit according to one illustrative embodiment is shown.

In 602 a remote control configuration file request message 106 is generated, the remote control configuration file request message 106 containing operating characteristics of the remote control unit 102.

In 604, the remote control configuration file request message 106 is sent by the transmitter 204 of the remote control unit 102 to a remote control configuration file generating unit 404 (for example included in the remote-controllable device 104).

In 606, at least one remote control configuration file is received by the receiver 206 of the remote control unit 102 (transmitted, for example, by the remote control configuration file generating unit 404).

In 608, the remote control unit is configured in accordance with the at least one remote control configuration file (for example by the remote control configuration unit 210).

Figure 7:
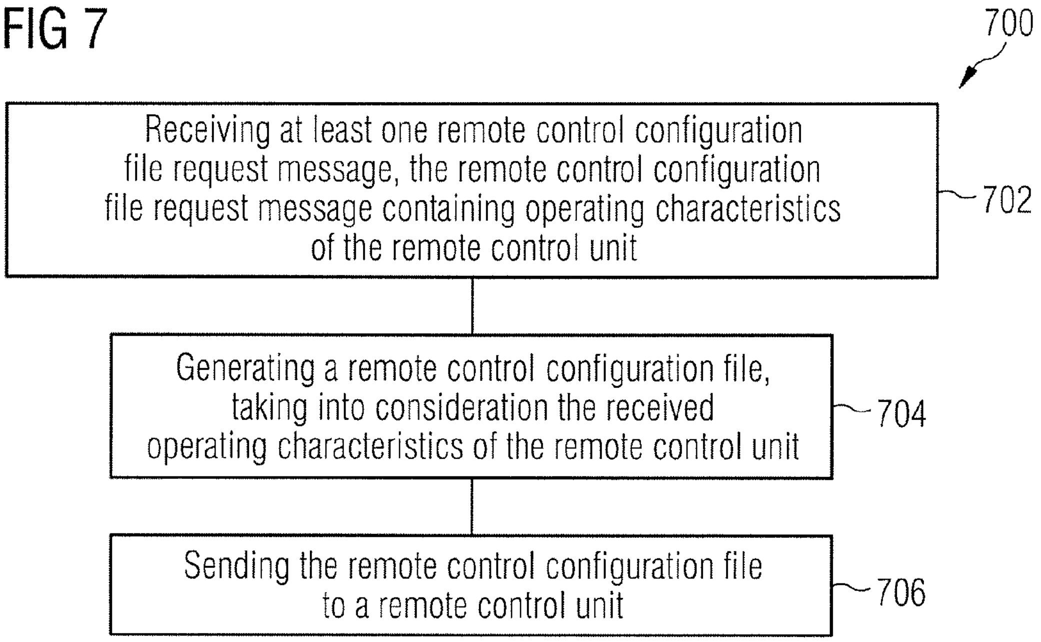
FIG. 7 shows a flow chart in which a method for generating a remote control configuration file according to an illustrative embodiment is shown.

FIG. 7 shows a flow chart 700 in which a method for generating a remote control configuration file according to one illustrative embodiment is shown.

In 702, at least one remote control configuration file request message 106 is received, the remote control configuration file request message 106 containing operating characteristics of the remote control unit 102.

In 704, a remote control configuration file is generated, taking into consideration the received operating characteristics of the remote control unit 102 (for example by means of the remote control configuration file generator 410).

In 706, the remote control configuration file is sent to the remote control unit 102 (for example in the remote control configuration file response message 108).

Figure 8:
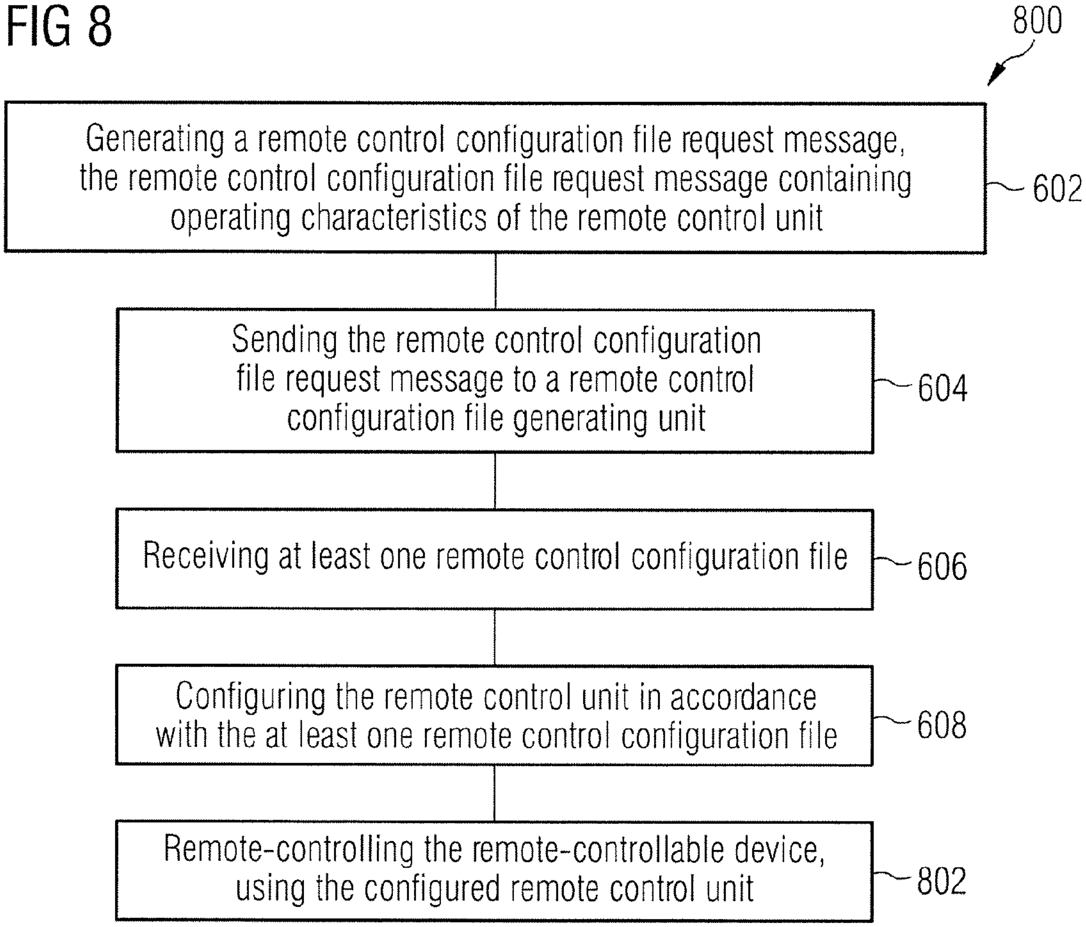
FIG. 8 shows a flow chart in which a method for remote-controlling a remote-controllable device according to an illustrative embodiment is shown.

FIG. 8 shows a flow chart 800 in which a method for remote-controlling a remote-controllable device 104 according to one illustrative embodiment is shown.

In 602, a remote control configuration file request message 106 is generated, the remote control configuration file request message 106 containing operating characteristics of the remote control unit 102.

In 604, the remote control configuration file request message 106 is sent by the transmitter 204 of the remote control unit 102 to a remote control configuration file generating unit 404 (for example in the remote-controllable device 104).

In 606, at least one remote control configuration file is received by the receiver 206 of the remote control unit 102 (sent, for example, by the remote control configuration file generating unit 404).

In 608, the remote control unit is configured in accordance with the at least one remote control configuration file (for example by the remote control configuration unit 210).

In 802, the remote-controllable device 104 is remote-controlled by using the configured remote control unit 102.

Figure 9:
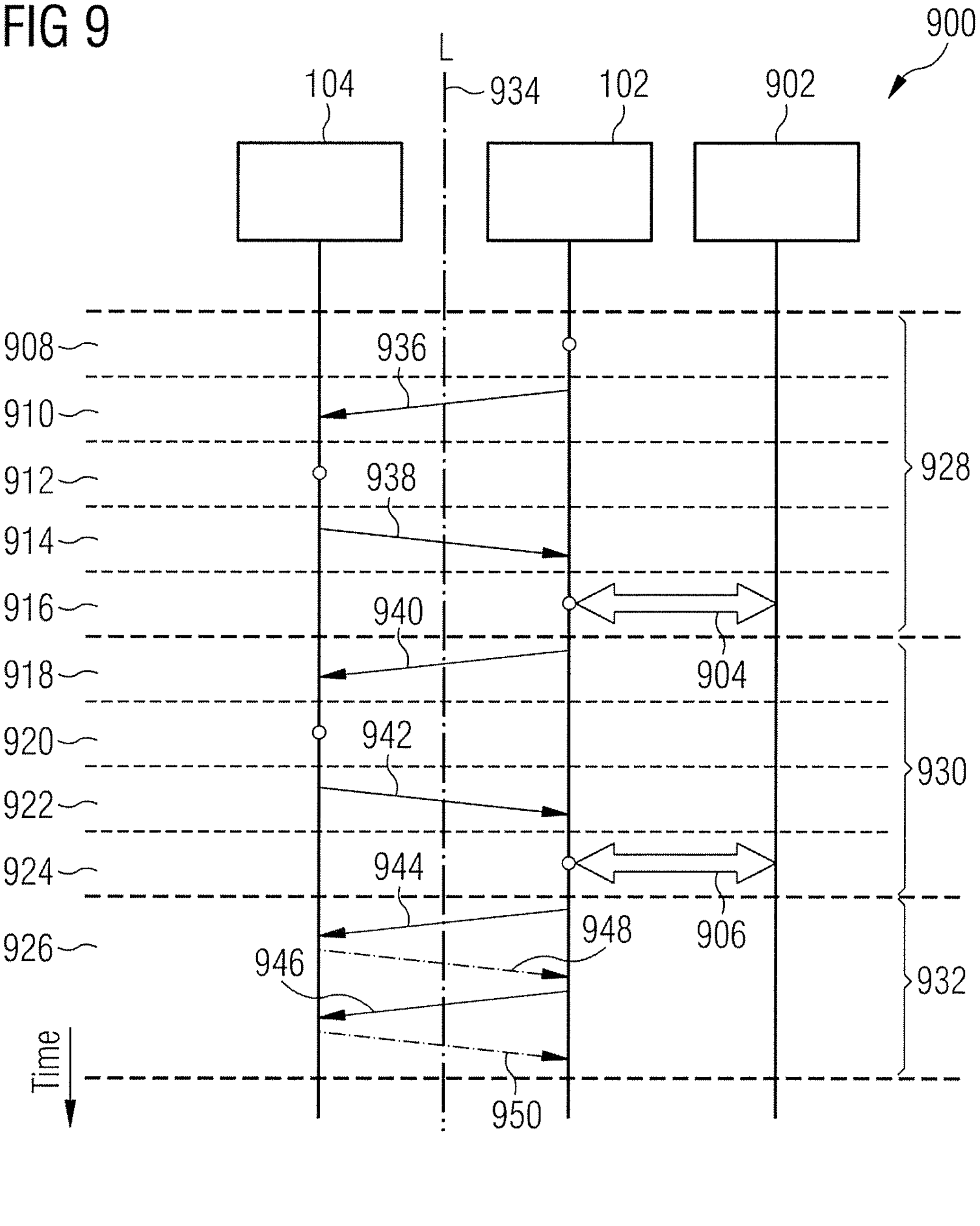
FIG. 9 shows a message flow chart in which the message flow for configuring a remote control unit and for remote-controlling a remote-controllable device according to an illustrative embodiment is shown.

FIG. 9 shows a message flow chart 900 (transaction diagram) in which the message flow for configuring a remote control unit 102 and for remote-controlling a remote-controllable device 104 according to one illustrative embodiment is shown.

On the left-hand side of the message sequence chart 900, the entity I to be controlled, for example the remote-controllable device 104, is shown, on the right-hand side of the message sequence chart 900 the remote control unit (RCU) 102 is shown. For optional interactions between the remote control unit RCU 102 and the user there is also shown a user (in other words operator) 902 on the far right in FIG. 9. Interactions between remote control unit 102 and user 902 are shown by means of a respective double arrow 904, 906 (compare 916 and 924 in FIG. 9).

As shown in FIG. 9, the method according to one illustrative embodiment has three phases for exchanging remote control unit-specific information, for example an initialization phase 928, a negotiation phase 930 and a control phase 932.

The interface 934 between the remote control unit 102 and the entity I to be controlled (e.g. 104) is represented by a dashed line labelled "L"; it can be formed as air interface, for example according to the standard of a local area radio transmission technology, for example according to an ad-hoc communication network standard. Messages which are exchanged between the remote control unit RCU 102 and the entity I (e.g. 104) via this interface are represented as thin arrows and marked by the designations 936, 938, 940, 942.

Figure 10:
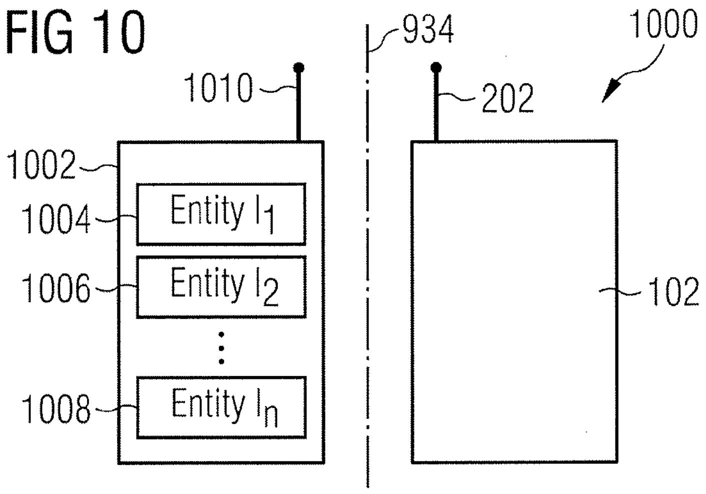
FIG. 10 shows a communication system with a remote control unit and a remote-controllable device according to another illustrative embodiment.

Without restricting its generality, it must be pointed out that the method according to one illustrative embodiment can also be used when there are a number of entities to be controlled (for example entities $I_1$ 1004, $I_2$ 1006, . . . , $I_n$ 1008) located on the same device D 1002 (see, for example, arrangement 1000 in FIG. 10) and there is only a single interface L 934 between the device D 1002 and the remote control unit 102, by means of which radio signals can be exchanged via the antenna 202 of the remote control unit 102 and via an antenna 1010 of the device D 1002. Thus, for example, different personal computer applications can configure the same remote control unit 102 for their respective different purposes via the local area radio transmission technology Bluetooth.

In one illustrative embodiment, the method from FIG. 9 can be arranged in three phases.

An initialization phase 928 has processes 908, 910, 912, 914, 916 which will be explained in greater detail in the text which follows.

In 908, the remote control unit RCU 102 determines, for example, information about type, number, position and labelling of its keys/navigation rockers, number and position of its soft keys, properties and position of its displays, capabilities and position of touch screens etc. In addition, the preferences and experience of the user 902 can also be determined, plus information about past configuration processes and information about the pattern of use by the user 902. A part of this information can be read out of a local data memory (for example from the memory 214), for example, another part can be possibly newly determined. For some of this information (for example for static hardware information and/or software information), it may be sufficient to determine an identification feature instead of the individual details. For example, the use of a device ID of the remote control unit 102, known at both ends (i.e. at the remote control unit 102 and the remote-controllable device 104) allows the individual details to be correlated with the remote control unit 102 used at the other end (for example the remote-controllable unit 104) and in addition saves bandwidth.

In 911, the remote control unit RCU 102 sends an initialization message 936 to the entity I to be controlled (for example 104) with the information determined in 908 if they are relevant for the current negotiation process.

In 912, the entity I (e.g. 104), which later is to receive and execute the control commands of the remote control unit RCU 102, initially evaluates the initialization message 936. On the basis of the parameters, included therein, from the four categories of hardware features and/or software features and/or user preferences and/or usage history, described above, the entity I (e.g. 104) calculates a first configuration file C and edits it for sending back in the form of a configuration proposal message 938 (for example in the form of the remote control configuration file response message 108). It is advantageous in this context if the configuration file C has an hierarchical structure so that either the user 902 (manually) or the remote control unit RCU 102 (automated) can accept parts of the configuration proposal and reject other parts of the configuration proposal, depending on the application scenario. This will still be discussed in greater detail in the more detailed illustrative embodiments further below. In one illustrative embodiment, the configuration file C can have at least the information which, from the point of view of the entity I (e.g. 104) allow an optimum keypad allocation of the remote control unit RCU 102 (on the basis of the information and/or identification features transmitted in the initialization message 936).

In 914, the entity I (e.g. 104) sends a configuration proposal message 938 which includes a first configuration file C back to the remote control unit RCU 102. The hierarchical structure of the first configuration file C enables both supplementary and alternative configuration proposals to be specified for the remote control unit RCU 102.

In the remote control unit RCU 102, the first configuration proposal obtained from the first configuration proposal message 938 (for example in the form of the first configuration file C) is evaluated either automatically or after interaction with the user 902.

This is shown in 916. In this context, it is provided, according to an illustrative embodiment, that the entity I (e.g. 104) integrates an authentication feature into the first configuration proposal message 938, by means of which the remote control unit RCU 102 can check the class, the manufacture and/or the type of the entity I (e.g. 104) without doubts. Due to the hierarchical structure of the first configuration file C, the remote control unit RCU 102 can wholly or partially accept or reject, respectively, the first configuration proposal.

According to one illustrative embodiment, authentication designates the process of checking the identity of a counterpart (for example a person or a computer program, in this case the originator of the first configuration proposal message 938 or of a second configuration proposal message 942, explained in still greater detail in the text which follows).

A negotiation phase 930 has processes 918, 920, 922, 924 which will still be explained in greater detail in the text which follows.

In 918, the remote control unit RCU 102 sends a response message 940 to the previously received first configuration proposal message 938 back to the entity I (e.g. 104). With this response message 940, the entity I (e.g. 104) can be informed of the decision of the remote control unit RCU 102 with regard to the accepted or rejected parts of the first configuration file C.

According to one illustrative embodiment, it is provided that the response message 940 also contains the information whether on the side of the remote control unit RCU 102 a continuation of the negotiation of the configuration details is wanted or not wanted or is required or not required, respectively.

In 920, the entity I (e.g. 104) to be controlled evaluates the response message 940 and, possibly, generates a new configuration proposal, i.e., for example, a second configuration file C*. Here, too, it is again provided according to an illustrative embodiment that the second configuration file C* has an hierarchical structure so that later either the user 902 (manually) or the remote control unit RCU 102 (automated) can accept or reject parts of this second configuration proposal depending on application scenario.

In 922, the entity I (e.g. 104) again sends a configuration proposal message, for example a second configuration proposal message 942 which contains the second configuration file C*, back to the remote control unit RCU 102 for the purpose of continuing the negotiation of the configuration details, particularly the keypad allocation. Here, too, the specification of supplementary or alternative configuration proposals for the remote control unit RCU 102 can be expressed by an hierarchical structure of the second configuration file C*.

Analogously to the statements in 916, the remote control unit RCU 102 takes in 924 from the second configuration proposal message 942 the second configuration file C* and evaluates it. The use/activation of the new configuration proposal can be initiated either automatically by the remote control unit RCU 102 or after interaction with the user 902 (depending on application scenario). Here, too, it is assumed that the second configuration proposal message 942 or second configuration file C*, respectively, contains an authentication feature which has been integrated by the entity I (e.g. 104) and by means of which the remote control unit RCU 102 can check the class, the manufacturer and/or the type of the entity I (e.g. 104) without doubt. If the second configuration proposal, too, is not accepted wholly or partially, it is possible to renegotiate according to one illustrative embodiment.

In this case, the processes 918, 920, 922, 924 will again be run through until either the remote control unit RCU 102 automatically or the user 902 after manual interaction finally agrees to the new configuration proposal in a received configuration proposal message and the remote control unit RCU 102 is optimally adapted to the entity I (e.g. 104) according to the boundary conditions described above (hardware features, software features, user preferences and/or utilization history). According to one illustrative embodiment, it is proposed to count the passes at both ends and when a previously defined threshold value is exceeded, to permit no further iterations and terminate the negotiation.

If a configuration proposal is accepted, the remote control unit RCU 102 is optimally configured for controlling the entity I (e.g. 104), i.e., for example, the allocation of the individual keys and the use of the display (for example in conjunction with soft keys) were effected taking into consideration the boundary conditions from the four categories of hardware features, software features, user preferences and/or usage history.

A control phase 932 has a process 926 which will be explained in greater detail in the text which follows.

In 926, the remote control unit RCU 102 now sends control commands to the entity I (e.g. 104). This is shown in FIG. 9 by means of messages 944, 946 of the type CC (Control Commands). The entity I (e.g. 104) can again acknowledge (optionally) the error-free reception of the control commands sent out by the remote control unit RCU 102 (for example by means of messages 948, 950, shown dashed in FIG. 9).

In the further course of the transaction diagram 900, the control commands CC and the optional acknowledgement messages can be exchanged by means of techniques already in existence, depending on application scenario:

- The remote control unit RCU 102 sends IR signals and does not expect acknowledgement messages.
- The remote control unit RCU 102 sends RF signals and expects acknowledgement messages from the entity I (e.g. 104). In the case of transmission errors or unrecognized syntax, respectively, a retransmission of control commands CC in the form of RF signals can be initiated by the entity I (e.g. 104) by means of an error code in the acknowledgement messages.
- The remote control unit RCU 102 uses a special Bluetooth application profile for controlling the entity I (e.g. 104) in conventional manner, for example the AVRCP (Audio/Video Remote Control Profile) or the HID (Human Interface Device) profile.

The described method for exchanging information which can be used for configuring a remote control unit 102 (initialization phase 928 and negotiation phase 930) can be implemented in any network (for example in any communication network), in principle. In one illustrative embodiment, the use of the method disclosed here in a wireless ad-hoc communication network is provided which is arranged, for example, as a separate Bluetooth application profile in accordance with the Bluetooth communication standard.

In the text which follows, an illustrative embodiment is described in which a remote control unit RCU1 1100 (see FIG. 11) is adapted for remote-controlling a garage door T1.

In this example, the simple allocation of new functions to keys is described.

Figure 11:
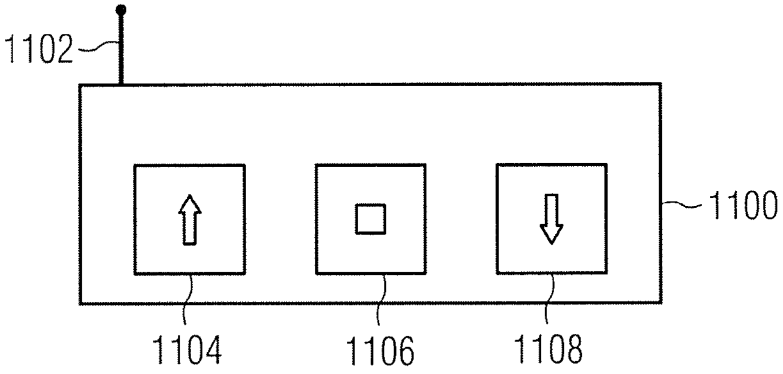
FIG. 11 shows a remote control unit according to another illustrative embodiment.

For this purpose, the following assumptions are made:

- The remote control unit and the garage door T1 communicate with one another via RF signals (radio).
- The garage door T1 offers the following remote-controllable functionalities:
  - door open;
  - stop;
  - door shut.
- The remote control unit RCU1 1100 has an antenna 1102 and three labelled keys 1104, 1106, 1108 according to FIG. 11.

If the remote control unit RCU 11100 comes within range of the control unit of the garage door T1 (as an example for a remote-controllable device 104) for the first time, the remote control unit RCU1 1100 informs the control unit of the garage door T1 of its "capabilities" in the form of the initialization message 936 described above which, for example, is built up in accordance with the following Table 1:

TABLE 1

Information elements in the initialization message 936 according to one illustrative embodiment

| Information element | Presence | Description |
|---|---|---|
| Message type | Obligatory | Identifies this message as initialization message 936 |
| Transaction feature | Obligatory | Identifies the commonality of a pair of messages |
| Version code number | Obligatory | Indicates the version number of the protocol used |
| Receiving entity ID | Optional | Identifier of the entity addressed |
| Transmitting entity ID | Optional | Identifier of the transmitting entity |
| Config ID | Optional | Identifiers of configuration files already stored in the remote control unit RCU 1100 |
| Features relevant to the illustrative embodiment | Obligatory | Detailed information about hardware features and/or software features and/or user preferences and/or usage history of the hardware, for example in the form of an XML document |

In detail, the initialization message 936 could use the individual information about hardware features and/or software features and/or user preferences and/or usage history in XML coding, using a document type definition (DTD) not specified here in greater detail.

Tables 2 and 3 show two possible embodiments according to one illustrative embodiment.

Considering first Table 2 in which only a product identification feature and a reference to a storage location in the Internet are included from which further information is available for downloading. In this case, it would be the task of the entity I (e.g. 104) receiving the initialization message 936 (in this case of the control unit of the garage door T1) to determine all features needed, particularly the multiple static hardware features and software features of the remote control unit 1100 and of generating a configuration proposal C on the basis of this restricted set of information. If necessary, the entity I (e.g. 104) sets up a connection to an external database, for example in the Internet (e.g. 912 in FIG. 9) for determining the hardware features and software features. Information about the preferences of the user and/or about the usage history of the remote control unit 1100, all of which are of multiple dynamic nature, cannot be transmitted to the device D (e.g. 104) by means of the XML document shown in Table 2.

TABLE 2

Illustrative structure of an XML document for transmitting references to remote control features to the entity I.

```
<?xml version=1.0">
<!DOCTYPE body PUBLIC "Remote__Control__Unit"
      "http://www.database.com/downloads/dtd/RCU.dtd">
<body>
   <product__id>002.608.197.409.041.975</product__id>
   <details>www.abc.com/service/downloads/product__id</details>
</body>
```

Table 3 shows an alternative XML document with a different structural configuration which makes this possible.

The illustrative XML document shown in Table 3 makes it possible to inform the entity I (e.g. 104) of the details for each relevant feature.

In the present example, these are:

Hardware Features:

The remote control unit RCU1 (compare FIG. 11) has three labelled keys; a first key 1104 is labelled "arrow up", a second key 1106 is labelled "square", a third key 1108 is labelled "arrow down"; there are no soft keys; there is no display.

Software Features:

The remote control unit RCU1 1100 does not support the programming of macrofunctions.

User Preferences:

The user 902 wishes that the configuration of his remote control unit RCU1 1100 should be as simple as possible.

Usage History:

The remote control unit RCU1 1100 was last matched to a video record "VCR" by the company "company_xyz" with the product ID "002.608.197.409.041.975".

TABLE 3

Alternative illustrative structure of an XML document for a comprehensive transmission of the remote control features to the entity I

```
<?xml version=1.0">
<!DOCTYPE body PUBLIC "Remote__Control__Unit"
      "http://www.database.com/downloads/dtd/RCU.dtd">
<body>
   <class = "hardware">
    <labels labeled keys = "3">
     <k1>arrow__up</k1>
     <k2>square</k2>
     <k3>arrow__down</k3>
    </labels>
    <soft__keys>0</soft__keys>
    <display>no</display>
</class>
   <class = "software">
    <macro__support>no</macro__support>
</class>
   <class = "preferences">
    <configuration>simple</configuration>
</class>
    <class = "history">
     <last__controlled__device>
     <product__id>002.608.197.409.041.975</product__id>
     <type>vcr</type>
     <manufacturer>company__xyz</manufacturer>
    </last__controlled__device>
</class>
</body>
```

In contrast to Table 2, distinctly more information about the relevant features can be conveyed to the entity I (e.g. 104) (in this case the control unit of the garage door T1) by means of such a detailed XML document so that the control unit of the garage door T1 does not necessarily need to set up a connection to an external database, for example in the Internet, in this case but can calculate the configuration proposal directly (e.g. process 912 in FIG. 9).

Apart from the illustrative XML documents shown in Tables 2 and 3, mixed forms and variants with other codings, i.e. deviating from XML, can naturally also be used for informing the entity I (e.g. 104) to be controlled about the relevant features of the remote control unit RCU1 1100.

According to FIG. 9, a first configuration proposal message 938 with a first configuration file C which is matched to the relevant features of the remote control unit RCU1 1100 is now sent back to the remote control unit RCU1 1100 by the control unit of the garage door T1 in 914.

The first configuration proposal message 938 could be structured, for example, in accordance with Table 4:

TABLE 4

Possible information elements in the configuration proposal message 938, 942

| Information element | Presence | Description |
|---|---|---|
| Message type | Obligatory | Identifies this message as configuration proposal message 938 |
| Transaction feature | Obligatory | Identifies the commonality of a pair of messages |
| Version code number | Obligatory | Indicates the version number of the protocol used |
| Receiving entity ID | Optional | Identifier of the entity addressed |
| Transmitting entity ID | Optional | Identifier of the transmitting entity |
| Iteration number | Optional | Counter which can be incremented with each pass (=0 in the initialization phase, >0 in the negotiation phase) |
| Config ID | Optional | Identifier of a configuration file already stored in the remote control unit RCU |
| Config command | Optional | This information element can be used to indicate to the remote control unit RCU what is to happen with the configuration files already stored: e.g. deleting, completing, overwriting, etc. |
| Configuration proposal | Obligatory | Configuration file C. For example in the form of an XML document |

Table 5 shows the structure of a first configuration file C according to one illustrative embodiment.

TABLE 5

Sample structure of an XML document for a configuration file C

```
<?xml version=1.0”>
<!DOCTYPE body PUBLIC “Configuration__Proposal”
        “http://www.database.com/downloads/dtd/RCU.dtd”>
<body>
<auth__id = “123.456.789”>
 <class = “hardware”>
    <key1>
     <modify>
      <new__command = “0x20”> <! open door>
     </modify>
    </key1>
    <key2>
     <modify>
      <new__key__id = “0x15”> <! stop>
     </modify>
    </key2>
    <key3>
     <modify>
      <new__command = “0x21”> <! close door>
     </modify>
    </key3>
 </class>
</body>
```

In the first configuration proposal message 938, a configuration proposal in XML coding could be used by using a document type definition (DTD) not specified in greater detail here.

Table 5 shows a possible embodiment according to one illustrative embodiment.

In a first “hardware” section, three change commands are listed in sequence for the new key functions. In principle, there are two possibilities of allocating the keys. Both are shown in Table 5 and differ by the keywords <new_command> (in the case of keys T1 and T3) and <new_key_id> (in the case of key T2).

In a first case <new_command>, the hexadecimal value “0x20” is to be sent out directly as new control code when pressing on the first key 1104 (or “0x21” when pressing on the third key 1108).

In the second case <new_key_id>, the hexadecimal value “0x15” is used as reference to a control code stored under the ID “0x15” in the remote control unit RCU1 1100, which is to be sent out each time the second key 1106 is pressed, instead of the control code originally provided there.

Use of the expression <new_command> has the advantage that the remote control unit RCU1 1100 does not need to have the fitting control code stored in an internal memory whereas the use of the expression <new_key_id> necessitates that for each key identification number (key_id) there should be a corresponding control code stored in the internal memory of the remote control unit RCU1 1100 and both devices (that is to say both the entity I (e.g. 104) and the remote control unit RCU1 1100) must have knowledge about the current allocation table in each case.

In the present example, the remote control unit RCU1 1100 accepts the configuration proposal from the first configuration proposal message 938 according to process 916 without further negotiation (compare processes 918, 920, 922, 924 in FIG. 9).

It is now possible to switch to the control phase 932.

In the text which follows, another illustrative embodiment is described in which a remote control unit RCU1 1100 is adapted for remote-controlling a garage door T2.

In the present example, the negotiation of the remote control functions will be discussed in greater detail.

For this purpose, the following assumptions are made:

The remote control unit and the garage door T2 communicate with one another via RF signals (radio).

The garage door T2 offers the following remote-controllable functionalities:

- open door;
- stop;
- shut door;
- switch on illumination;
- switch off illumination.

The remote control unit RCU1 1100 has three labelled keys 1104, 1106, 1108 according to FIG. 11.

The processes 908, 910, 912 can run analogously to the statements in the above example.

It is assumed this time that the initialization message 936 does not contain any detailed information about the labelling of the keys 1104, 1106, 1108 but only the information “there are three keys”.

Since the control unit of the garage door T2 now provides for more functions than in the case of garage door T1 (now five, previously only three), it sends a first configuration proposal message 938 with different content back to the remote control unit RCU1 1100.

In this context, Table 6 shows an XML coding, again by using a document type definition (DTD) not specified in greater detail here.

In a first section, opened and closed by the keyword <alternative> with the ordinal number “0”, the three desired change commands for allocating the keys, determined by the entity I (e.g. 104) (i.e. by the control device of the garage door T2) are listed in sequence. Different from the above example, only the use of the keyword <new_key_id> is described here for reasons of better clarity.

In a second section, opened and closed by the keyword <alternative> with the ordinal number “1”, an alternative configuration is offered to the remote control unit RCU1 1100: instead of allocating the new control command 0x20

(open door) to the first key 1104 and 0x21 (close door) to the third key 1108, the offer is made to the remote control unit RCU1 1100 to allocate the new control command 0x1B (light on) to the first key 1104 and 0x1C (light off) to the third key 1108. This does not affect the functional allocation of the second key 1106 (stop) for which no alternative is offered.

It is also conceivable that in the alternative defined in the second section, the keyword <new_command> is in each case used instead of the keyword <new_key_id>.

It is also possible to specify further different alternatives within an XML document. The entity I (e.g. 104) (in this case the control unit of the garage door T2) can express the order of alternatives calculated by it (a type of preference list) either by the order of the corresponding sections in the XML structure or by numbering (by using ordinal numbers).

The example in Table 6 shows numbering within the keywords of <alternative> used. Other codings deviating from this are also conceivable.

TABLE 6

Illustrative structure of an XML document for a configuration file C with two alternative configurations

```
<?xml version=1.0">
<!DOCTYPE body PUBLIC "Configuration__Proposal"
        "http://www.database.com/downloads/dtd/RCU.dtd">
<body>
<auth__id = "123.456.789">
  <alternative = "0">
   <class = "hardware">
    <key1>
     <modify>
      <new__key__id = "0x20"> <! open door>
     </modify>
    </key1>
    <key2>
     <modify>
      <new__key__id = "0x15"> <! stop>
     </modify>
    </key2>
    <key3>
     <modify>
      <new__key__id "0x21"> <! close door>
     </modify>
    </key3>
  </alternative>
</class>
<alternative = "1">
   <class = "hardware">
    <key1>
     <modify>
      <new__key__id = "0x1B"> <! light on>
     </modify>
    </key1>
    <key3>
     <modify>
      <new__key__id = "0x1C"> <! light off>
     </modify>
    </key3>
   </class>
  </alternative>
</body>
```

As reaction to the reception of a first configuration proposal message 938 which contains the configuration file C according to Table 6, the remote control unit RCU1 1100 should now make a decision, either automatically or by inquiry of the user 902 according to the statements regarding 916. In the present example, the remote control unit RCU1 1100, due to its design, does not have any possibilities of interacting with the user 902 since it does not have a display, a loudspeaker etc.

A decision is therefore made in this illustrative embodiment on the basis of the operating history and the remote control unit RCU1 1100 decides to accept the main proposal (<alternative="0">) which is contained in the first section of the XML document in Table 6.

However, the remote control unit RCU1 1100 does not have the allocation tables in this example which would be a prerequisite for a correct functional allocation with the aid of the keyword <new_key_id>.

It is assumed that the remote control unit RCU1 1100 demands keywords of the type <new_command> in this example. In consequence, the remote control unit RCU1 1100 should now enter the negotiation phase 930 according to FIG. 9 (compare processes 918, 920, 922, 924) and inform the entity I (e.g. 104) of this situation. For this purpose, the remote control unit RCU 1 1100 sends a response message 940 to the control unit of the garage door T2 (the "entity I"). This response message 940 could be structured, for example, according to Table 7.

Table 8 shows the possible structure of a negotiation file N, contained in the response message 940, in the form of an XML_document.

TABLE 7

Possible information elements in the response message 940

| Information element | Presence | Description |
|---|---|---|
| Message type | Obligatory | Identifies this message as response message 940 |
| Transaction feature | Obligatory | Identifies the commonality of a pair of messages |
| Version code number | Obligatory | Indicates the version number of the protocol used |
| Receiving entity ID | Optional | Identifier of the entity addressed |
| Transmitting entity ID | Optional | Identifier of the transmitting entity |
| Iteration number | Optional | Counter which can be incremented with each pass (=0 in the initialization phase, >0 in the negotiation phase) |
| Negotiation code | Optional | Contains the identifier of a configuration proposal message previously sent to which this response message refers |
| Negotiation proposal | Obligatory | Negotiation file N. For example in the form of an XML document |

TABLE 8

Illustrative structure of a negotiation file N

```
<?xml version=1.0">
<!DOCTYPE body PUBLIC "Negotiation__Proposal"
        "http://www.database.com/downloads/dtd/RCU.dtd">
<body>
  <class = "hardware">
   <alternative = "0">
    <replace>
     <new__key__id>
     <new__command>
    </replace>
   </alternative>
  </class>
</body>
```

According to the statements regarding 920, the entity I (e.g. 104) evaluates the response message 940 and generates a new configuration proposal, i.e. a second configuration file C*, wherein the wish of the remote control unit for an exchange of the two function allocation variants (replace <new_key_id> by <new_command> in <alternative="0">) is taken into consideration.

The result is shown in Table 9. Due to the change in keywords, the values following the keywords are now also different from the values in the above XML document (Table 6).

TABLE 9

Illustrative configuration file C*

```
<?xml version=1.0">
<!DOCTYPE body PUBLIC "Configuration__Proposal"
        "http://www.database.com/downloads/dtd/RCU.dtd">
<body>
<auth__id "123.456.789">
 <class = "hardware">
  <key1>
   <modify>
    <new__command = "0x32"> <! open door>
   </modify>
  </key1>
  <key2>
   <modify>
    <new__command = "0x33"> <! stop>
   </modify>
  </key2>
  <key3>
   <modify>
    <new__command = "0x34"> <! close door>
   </modify>
  </key3>
 </class>
</body>
```

These are no longer references to control commands stored in allocation tables but directly to the control codes which are to be used by the remote control unit RCU1 1100.

In 922, the entity I sends a second configuration proposal message 942 which, however, now contains a second configuration file C*, back to the remote control unit RCU 11100 for continuing the negotiation of the configuration details. The remote control unit RCU1 1100 evaluates the second configuration file C* included in the second configuration proposal message 942.

Since the entity I has completely accepted the change proposal of the remote control unit RCU1 1100 in this example, it accepts the second configuration proposal without further post-negotiations in 924.

It is now possible to switch to the control phase.

In the text which follows, another illustrative embodiment is described in which a different remote control unit RCU2 1200 (see FIG. 12) is adapted for remote-controlling a garage door T2.

Figure 12:
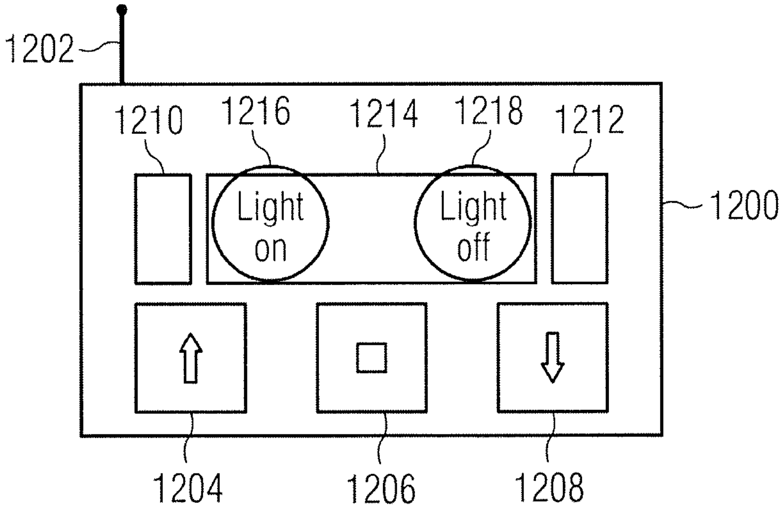
FIG. 12 shows a remote control unit according to yet another illustrative embodiment.

For this purpose, the following assumptions are made:

- The remote control unit 1200 and the garage door communicate with one another by RF signals (radio).
- The garage door T2 offers the following remote-controllable functionalities:
  - open door;
  - stop;
  - close door;
  - switch on illumination;
  - switch off illumination.
- The remote control unit RCU2 1200 is equipped with an antenna 1202, three labelled keys 1204, 1206, 1208, two soft keys 1210, 1212 and a small display 1214 (for example for displaying 750*250 pixels) according to FIG. 12. On the display 1214, two areas 1216, 1218 are provided for displaying texts and/or pictograms in order to label the two soft keys 1210, 1212 on the side. As an alternative, a touch screen (i.e. a touch-sensitive display) can also be provided instead of the two soft keys 1210, 1212 and the display 1214, which combines the functions of the two soft keys 1210, 1212 and the display 1214.

If the remote control unit RCU2 1200 comes within range of the control unit of the garage door T2 for the first time, the remote control unit RCU2 1200 informs the control unit of the garage door T2 of its "capabilities" in the form of the initialization message 936 described in detail above.

Here, too, the initialization message 936 contains all details about hardware features and/or software features and/or user preferences and/or usage history in XML coding, using a document type definition (DTD) not specified in greater detail here.

Table 10 shows such an illustrative XML document:

TABLE 10

Illustrative structure of an XML document for a comprehensive transmission of the remote control features to the entity I

```
<?xml version=1.0">
<!DOCTYPE body PUBLIC "Remote__Control__Unit"
        "http://www.database.com/downloads/dtd/RCU.dtd">
<body>
 <class = "hardware">
  <keys>
   <labeled__keys = "3">
    <lk1>arrow__up</lk1>
    <lk2>square</lk2>
    <lk3>arrow__down<lk3>
   </labeled__keys>
   <soft__keys = "2">
    <sk1>
     <position>left</position>
     <display__support>yes</display__support>
    </sk1>
    <sk2>
     <position>right</position>
     <display__support>yes</display__support>
    </sk2>
   </soft__keys>
   <display__width>750</display__width>
   <display__height>260</display__height>
   <pictogram__support>yes</pictogram__support>
  </keys>
 </class>
 <class = "software">
  <macro__support>yes</macro__support>
  <chain__depth>3</chain__depth>
 </class>
 <class = "preferences">
  <look__and__feel>
   <manufacturer>pear</manufacturer>
   <product__class>mp3__player</product__class>
   <model>e-pal</model>
  </look__and__feel>
 </class>
</body>
```

Hardware Features:

The remote control unit RCU2 1200 (compare FIG. 12) has three labelled keys 1204, 1206, 1208. A first key 1204 is labelled with "arrow up"; a second key 1206 is labelled with "square"; a third key 1208 is labelled with "arrow down". There are two soft keys 1210, 1212 and a small display 1214 which has two areas 1216, 1218 which can be utilized for labelling the soft keys (or as an alternative there is a touch screen with two configurable areas).

Software Features:

The remote control unit RCU2 1200 supports the programming of macrofunctions with a concatenation depth of three functions at a maximum.

User Preferences:

The user 902 wishes that the configuration of his remote control unit RCU2 1200 should be adapted as far as possible to the HMI (Human Machine Interface) of his mp3 player (e.g. "e-pal" model by the company "Pear"), with the operation of which he is very familiar. These adjustments can have been selected by the user, for example, the first time he has taken his remote control unit RCU2 1200 into operation, from data records stored in the remote control unit RCU2 1200, via a menu, e.g. by means of the display 1214 and the three labelled keys 1204, 1206, 1208 and/or the two soft keys 1210, 1212 (or as an alternative by means of a touch screen).

Usage History:

Relevant information is omitted in this example for reasons of better clarity.

According to FIG. 9, a first configuration proposal message 938 according to Table 4 with a first configuration file C which is matched to the relevant features of the remote control unit RCU2 1200 is now sent back in 914 by the control unit of the garage door T2 to the remote control unit RCU2 1200.

Table 11 shows a possible embodiment for a configuration proposal in XML coding, using a document type definition (DTD) not specified in greater detail here.

In a first (and, in this example, only) section “hardware”, the labelled keys 1204, 1206, 1208 are sequentially associated with a new functionality (i.e. a new control code). After that, new control codes and the labelling desired by the entity I are specified for the two soft keys 1210, 1212.

This is followed by two further parameters with the aid of which the entity I meets the requirements of the user with regard to the “look and feel”. To create a similar HMI (Human Machine Interface) which the user is used to from his mp3 player, the background illumination of the screen and the colour of the writing should be correspondingly adapted.

In the present example, the keyword <new_command> is exclusively used which indicates that the hexadecimal value “0x32” is to be sent out directly as new control code when pressing on the first key 1204 (“0x33” when pressing on the second key 1206 etc.). The other keyword in <new_key_id>, with the aid of which it is possible to refer to a control code stored in the remote control unit RCU2 1200, which is to be sent out with each pressing of the corresponding key instead of the control code originally provided there, is not used here for reasons of better clarity.

In principle, however, a mixed form is also possible in this example and may be quite appropriate under given circumstances.

According to the above statements, the remote control unit RCU2 1200 accepts in 916 the illustrative configuration proposal C from the configuration proposal message 938 without further negotiation, i.e. the processes 918, 920, 922, 924 from FIG. 9 will not be run in this example.

TABLE 11

Illustrative structure of an XML document for a configuration file C

```
<?xml version=1.0”>
<!DOCTYPE body PUBLIC “Configuration_Proposal”
        “http://www.database.com/downloads/dtd/RCU.dtd”>
<body>
<auth_id = “123.456.789”>
 <class = “hardware”>
  <lk1>
   <modify>
    <new_command = “0x32”> <! open door>
   </modify>
  </lk1>
  <lk2>
   <modify>
    <new_command = “0x33”> <! stop>
   </modify>
  </lk2>
  <lk3>
   <modify>
    <new_command = “0x34”> <! close door>
   </modify>
  </lk3>
  <sk1>
```

TABLE 11-continued

Illustrative structure of an XML document for a configuration file C

```
   <modify>
    <new_command = “0x4A”> <! light on>
    <display_text = “light on”>
   </modify>
  </sk1>
  <sk2>
   <modify>
    <new_command = “0x4B”> <! light off>
    <display_text = “light off”>
   </modify>
  </sk2>
  <background_light = “0x00”>
  <fond_color = “0x05”>
 </class>
</body>
```

If a remote control unit RCU 102 is capable of storing one or a number of configuration file(s) C for a period which is distinctly longer than the period of the actual control of an entity I, it is also possible that the initialization message 936 includes identifiers of this (these) configuration file(s) C already stored (the information element config ID in Table 1 stands for this).

During the next connection set-up, the entity I can check with the aid of such identifiers whether configuration file(s) C useable with regard to the criteria are already stored in the remote control unit RCU 102. Thus, the first configuration proposal message 938 following an initialization message 936 does not necessarily have to contain complete configuration proposals in the form of configuration files C but can also contain configuration proposals in the form of references to configuration files R. It may thus be possible to save bandwidth.

Should the check in entity I show that a configuration file C stored in the remote control unit RCU 102 is no longer current or, respectively, does not correspond to the current requirements of the remote control unit RCU 102 with regard to the criteria, it is also possible to transmit only the delta (i.e. the deviation) of the configuration details to the remote control unit 102 in a first configuration proposal message 938.

For this purpose, the two information elements config ID and config command exist in the first configuration proposal message 938 (Table 2).

At this point, however, the details will not be discussed further since the coding possibilities for the delta, for example in the form of an XML document, tend towards infinity.

Table 12 contains a list with abbreviations which are frequently used in the present description

TABLE 12

List of abbreviations

| Abbreviation | Description |
|---|---|
| D | Device |
| I | Instance, entity |
| RCU | Remote Control Unit |
| HMI | Human Machine Interface |
| C | Configuration file, configuration data |
| R | Reference to configuration file<br>Reference to configuration data |
| N | Negotiation file, negotiation data |
| CC | Control command |

In one illustrative embodiment, a method is provided for automatically exchanging remote control-specific information between a remote control unit and an entity which can be controlled by means of this remote control unit.

In this context, the details of the remote control functionalities are negotiated between the two devices involved, for example especially taking into consideration hardware characteristics, software capabilities and numerous "soft" criteria (such as experience, familiarity and preference of the user with regard to other device (classes), operating concepts and usage histories etc.).

The resultant configuration file is used by the remote control unit, for example for allocating keys, soft keys and display (areas), navigation rockers, macrostores, touch screen (areas) etc. with corresponding functions.

The methods described can be used, for example, in a wireless ad-hoc communication network. If the selected short-range radio transmission technology is a Bluetooth piconetwork, the method presented here can be implemented as a separate Bluetooth application profile.

According to one embodiment, a remote control configuration file generating circuit is provided which has:

- a receiver which is set up for receiving at least one remote control configuration file request message, the remote control configuration file request message containing operating characteristics of a remote control unit which have information about the usage characteristic of a user of the remote control unit;
- a remote control configuration file generator which is set up for generating a remote control configuration file, taking into consideration the received operating characteristics of the remote control unit; and
- a transmitter which is set up for sending the remote control configuration file to a remote control unit.

According to one example of this embodiment, the operating characteristics contain at least one of the following information items:

- characteristics of at least one input circuit of the remote control unit;
- characteristics of at least one output circuit of the remote control unit.

According to an example of this embodiment, the characteristics of at least one input circuit of the remote control unit contain at least one of the following information items:

- information about the function programmability of the at least one input circuit;
- information about the placement programmability of the at least one input circuit.

According to an example of this embodiment, the operating characteristics of the remote control unit include at least one of the following information items:

- information about hardware features of the remote control unit;
- information about software features of the remote control unit;
- information about preferences of the user of the remote control unit;
- information about the history of usage of the remote control unit.

According to an example of this embodiment, the information about hardware features of the remote control unit includes at least one of the following information items:

- device identification characteristics;
- number and position of non-programmable keys;
- number and position of programmable keys;
- number and position of software-based keys;
- number, characteristics and position of at least one display circuit;
- available storage space in the memory.

According to an example of this embodiment, the information about software features of the remote control unit includes at least one of the following information items:

- software identification characteristics;
- information about codecs supported by the remote control unit for displaying pixels or text elements;
- information about macrofunctions supported by the remote control unit;
- maximum permissible concatenation depth of macrofunctions.

According to an example of this embodiment, the information about preferences of the user of the remote control unit includes at least one of the following information items:

- the user prefers the use of an input element of the at least one input circuit;
- the user prefers the use of an output element of the at least one output circuit.

According to an example of this embodiment, the information about the history of usage of the remote control unit includes at least one of the following information items:

- information about at least one configuration of the remote control unit preceding in time;
- information about the frequency of use of an input element of the at least one input circuit;
- information about the frequency of use of an output element of the at least one output circuit.

According to an example of this embodiment, the characteristics of at least one output circuit of the remote control unit include at least one of the following information items:

- information about the function programmability of the at least one output circuit;
- information about the placement programmability of the at least one output circuit.

According to an example of this embodiment, the transmitter is set up as optical transmitter.

According to an example of this embodiment, the transmitter is set up as infrared transmitter.

According to an example of this embodiment, the transmitter is set up as radio transmitter.

According to an example of this embodiment, the transmitter is set up as radio transmitter of an ad-hoc radio communication network.

According to an example of this embodiment, the transmitter is set up as radio transmitter of a Bluetooth radio communication network.

According to an example of this embodiment, the receiver is set up as optical receiver.

According to an example of this embodiment, the receiver is set up as infrared receiver.

According to an example of this embodiment, the receiver is set up as radio receiver.

According to an example of this embodiment, the receiver is set up as radio receiver of an ad-hoc radio communication network.

According to an example of this embodiment, the receiver is set up as radio receiver of a Bluetooth radio communication network.

According to an example of this embodiment, the at least one remote control configuration file has data in at least one of the following formats:

- extensible markup language;
- hypertext markup language;
- Java computer program code.

According to an illustrative embodiment, a method for determining a configuration of a remote control unit is provided which includes:

generating a remote control configuration file request message, wherein the remote control configuration file request message contains operating characteristics of the remote control unit which have information about the usage characteristic of a user of the remote control unit;

transmitting the remote control configuration file request message to a remote control configuration file generating circuit;

receiving at least one remote control configuration file;

configuring the remote control unit in accordance with the at least one remote control configuration file.

According to an example of this embodiment, the method also includes the determining of operating characteristics of the remote control unit.

According to an example of this embodiment, the operating characteristics include at least one of the following information items:

characteristics of at least one input circuit of the remote control unit;

characteristics of at least one output circuit of the remote control unit.

According to an example of this embodiment, the characteristics of at least one input circuit of the remote control unit contain at least one of the following information items:

information about the function programmability of the at least one input circuit;

information about the placement programmability of the at least one input circuit.

According to an example of this embodiment, the operating characteristics of the remote control unit include at least one of the following information items:

information about hardware features of the remote control unit;

information about software features of the remote control unit;

information about preferences of the user of the remote control unit;

information about the history of usage of the remote control unit.

According to an example of this embodiment, the at least one remote control configuration file has data in at least one of the following formats:

extensible markup language;

hypertext markup language;

Java computer program code.

According to an embodiment, a method for determining a configuration of a remote control unit is provided which includes:

generating a remote control configuration file request message, the remote control configuration file request message including operating characteristics of the remote control unit;

sending the remote control configuration file request message to a remote control configuration file generating circuit;

receiving at least one remote control configuration file;

deciding whether the at least one remote control configuration file is at least partially accepted;

configuring the remote control unit at least partially in accordance with the at least one remote control configuration file if it has been decided to at least partially accept the at least one remote control configuration file.

According to an example of this embodiment, the method also includes the determining of operating characteristics of the remote control unit.

According to an example of this embodiment, the operating characteristics contain at least one of the following information items:

characteristics of at least one input circuit of the remote control unit;

characteristics of at least one output circuit of the remote control unit.

According to an example of this embodiment, the characteristics of at least one input circuit of the remote control unit include at least one of the following information items:

information about the function programmability of the at least one input circuit;

information about the placement programmability of the at least one input circuit.

According to an example of this embodiment, the operating characteristics of the remote control unit contain at least one of the following information items:

information about hardware features of the remote control unit;

information about software features of the remote control unit;

information about preferences of the user of the remote control unit;

information about the history of usage of the remote control unit.

According to an example of this embodiment, the at least one remote control configuration file has data in at least one of the following formats:

extensible markup language;

hypertext markup language;

Java computer program code.

According to an embodiment, a method for generating a remote control configuration file is provided which includes:

receiving at least one remote control configuration file request message, the remote control configuration file request message containing operating characteristics of a remote control unit;

generating a remote control configuration file, taking into consideration the received operating characteristics of the remote control unit;

sending the remote control configuration file to a remote control unit.

According to an example of this embodiment, the operating characteristics include at least one of the following information items:

characteristics of at least one input circuit of the remote control unit;

characteristics of at least one output circuit of the remote control unit.

According to an example of this embodiment, the characteristics of at least one input circuit of the remote control unit contain at least one of the following information:

information about the function programmability of the at least one input circuit;

information about the placement programmability of the at least one input circuit.

According to an example of this embodiment, the operating characteristics of the remote control unit include at least one of the following information:

information about hardware features of the remote control unit;

information about software features of the remote control unit;

information about preferences of the user of the remote control unit;

information about the history of usage of the remote control unit.

According to an example of this embodiment, the at least one remote control configuration file has data in at least one of the following formats:

extensible markup language;

hypertext markup language;

Java computer program code.

According to an embodiment, a method for remote-controlling a remote-controllable device is provided which includes:

generating a remote control configuration file request message, the remote control configuration file request message including operating characteristics of the remote control unit;

sending the remote control configuration file request message to a remote control configuration file generating circuit;

receiving at least one remote control configuration file;

configuring the remote control in accordance with the at least one remote control configuration file;

remote-controlling the remote-controllable device by using the configured remote control unit.

According to an embodiment, a telecommunication terminal is provided, with a remote control unit which includes:

a remote control configuration file request message generating circuit which is set up for generating a remote control configuration file request message, the remote control configuration file request message including operating characteristics of the remote control unit which have information about the usage characteristics of a user of the remote control unit;

a transmitter which is set up for sending the remote control configuration file request message to a remote control configuration file generating circuit;

a receiver which is set up for receiving at least one remote control configuration file;

a memory which is set up for storing the at least one remote control configuration file;

a remote control configuration circuit which is set up for configuring the remote control unit in accordance with the at least one remote control configuration file.

According to an example of this embodiment, the telecommunication terminal is set up as mobile radio communication terminal.

According to an example of this embodiment, the transmitter of the remote control unit is set up as radio transmitter of an ad-hoc radio communication network.

According to an example of this embodiment, the transmitter of the remote control unit is set up as radio transmitter of a wireless ad-hoc radio communication network.

A circuit can be a hardware circuit, for example an integrated circuit which is designed for the respective functionality, or a programmable unit such as, for example, a processor which is programmed for the respective functionality. A processor can be an RISC (reduced instruction set computer) processor or a CISC (complex instruction set computer) processor.

Although the invention has mainly been shown and described in conjunction with specific illustrative embodiments, the persons familiar with the technical field should understand that a great variety of changes in the embodiment and its details can be performed without deviating from the essence and field of the invention as defined by the subsequent claims. The range of the invention is therefore determined by the attached claims and it is intended that all changes which are within range of the significance and of the area of equivalence of the claims are covered by the claims.

What is claimed is:

1. A remote control unit, comprising:

a remote control configuration file request message generating circuit configured to generate a remote control configuration file request message, the remote control configuration file request message comprising operating characteristics of the remote control unit having information about a usage characteristic of a user of the remote control unit;

a transmitter configured to send the remote control configuration file request message to a remote control configuration file generating circuit of a remote-controllable device to be controlled by the remote control unit;

a receiver configured to receive at least one remote control configuration file from the remote-controllable device;

a memory configured to store the at least one remote control configuration file;

a decider configured to decide whether the at least one remote control configuration file is accepted by the remote control unit before the remote control unit is configured in accordance with the at least one remote control configuration file; and a remote control configuration circuit configured to configure the remote control unit in accordance with the at least one remote control configuration file if it has been decided that the at least one remote control configuration file is at least partially accepted by the remote control unit, wherein the transmitter is configured to send a further remote control configuration file request message to the remote control configuration file generating circuit if it has been decided that the at least one remote control configuration file is not accepted by the remote control unit; and wherein the at least one remote control configuration file has a hierarchical structure configured to specify a configuration proposal, a supplementary configuration proposal and an alternative configuration proposal, the hierarchical structure to facilitate partial acceptance or rejection of the at least one remote control configuration file by the remote control unit; and wherein the remote control is further configured to send control signals, the control signals configured to control the remote-controllable device.

2. The remote control unit according to claim 1, wherein the operating characteristics comprise at least one of characteristics of at least one input circuit of the remote control unit, and characteristics of at least one output circuit of the remote control unit.

3. The remote control unit according to claim 2, wherein the characteristics of at least one input circuit of the remote control unit comprise at least one of information about function programmability of the at least one input circuit, and information about placement programmability of the at least one input circuit.

4. The remote control unit according to claim 1, wherein the operating characteristics of the remote control unit comprise at least one of the information items selected from the group consisting of: information about hardware features of the remote control unit; information about software features of the remote control unit; information about preferences of the user of the remote control unit; and information about a history of usage of the remote control unit.

5. The remote control unit according to claim 4, wherein the information about hardware features of the remote control unit comprises at least one of the information items selected from the group consisting of: device identification characteristics; number and position of nonprogrammable keys; number and position of programmable keys; number and position of software based keys; number, characteristics and position of at least one display circuit; and available storage space in the memory.

6. The remote control unit according to claim 4, wherein the information about software features of the remote control unit comprises at least one of the information items selected from the group consisting of: software identification characteristics; information about codecs supported by the remote control unit for displaying pixels or text elements;

information about macro functions supported by the remote control unit; and maximum permissible concatenation depth of macrofunctions.

7. The remote control unit according to claim 4, wherein the information about preferences of the user of the remote control unit comprises at least one of the user prefers to use an input element of the at least one input circuit, and the user prefers to use an output element of the at least one output circuit.

8. The remote control unit according to claim 4, wherein the information about the history of usage of the remote control unit comprises at least one of the information items selected from the group consisting of: information about at least one configuration of the remote control unit preceding in time; information about a frequency of use of an input element of the at least one input circuit; and information about a frequency of use of an output element of the at least one output circuit.

9. The remote control unit according to claim 2, wherein the characteristics of at least one output circuit of the remote control unit comprise at least one of information about a function programmability of the at least one output circuit, and information about a placement programmability of the at least one output circuit.

10. The remote control unit according to claim 1, wherein the transmitter is set up as an optical transmitter.

11. The remote control unit according to claim 10, wherein the transmitter is set up as an infrared transmitter.

12. The remote control unit according to claim 1, wherein the transmitter is set up as a radio transmitter.

13. The remote control unit according to claim 12, wherein the transmitter is set up as a radio transmitter of an ad-hoc radio communication network.

14. The remote control unit according to claim 13, wherein the transmitter is set up as a radio transmitter of a Bluetooth radio communication network.

15. The remote control unit according to claim 1, wherein the receiver is set up as an optical receiver.

16. The remote control unit according to claim 15, wherein the transceiver is set up as an infrared receiver.

17. The remote control unit according to claim 1, wherein the receiver is set up as a radio receiver.

18. The remote control unit according to claim 17, wherein the receiver is set up as a radio receiver of an ad-hoc radio communication network.

19. The remote control unit according to claim 18, wherein the receiver is set up as a radio receiver of a Bluetooth radio communication network.

20. The remote control unit according to claim 1, wherein the at least one remote control configuration file has data in at least one of the formats selected from the group consisting of:

extensible markup language;

hypertext markup language; and

Java computer program code.

21. A method for determining a configuration of a remote control unit, comprising:

generating a remote control configuration file request message, the remote control configuration file request message including operating characteristics of the remote control unit having information about a usage characteristic of a user of the remote control unit;

sending the remote control configuration file request message to a remote control configuration file generating circuit of a remote-controllable device to be controlled by the remote control unit;

receiving at least one remote control configuration file from the remote-controllable device;

storing the at least one remote control configuration file;

deciding whether the at least one remote control configuration file is accepted by the remote control unit before configuring the remote control unit in accordance with the at least one remote control configuration file;

configuring the remote control unit in accordance with the at least one remote control configuration file if it has been decided that the at least one remote control configuration file is at least partially accepted by the remote control unit; and sending a further remote control configuration file request message to the remote control configuration file generating circuit if it has been decided that the at least one remote control configuration file is not accepted by the remote control unit; and sending control signals, the control signals configured to control the remote-controllable device;

wherein the at least one remote control configuration file has a hierarchical structure configured to specify a configuration proposal, a supplementary configuration proposal and an alternative configuration proposal, the hierarchical structure to facilitate partial acceptance or rejection of the at least one remote control configuration file by the remote control unit.

* * * * *